(12) United States Patent
Pribisic

(10) Patent No.: US 8,572,891 B2
(45) Date of Patent: Nov. 5, 2013

(54) VEHICULAR ANTI-PINCH SYSTEM WITH RAIN COMPENSATION

(75) Inventor: Mirko Pribisic, North York (CA)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 13/499,851

(22) PCT Filed: Oct. 4, 2010

(86) PCT No.: PCT/CA2010/001599
§ 371 (c)(1),
(2), (4) Date: Apr. 2, 2012

(87) PCT Pub. No.: WO2011/038514
PCT Pub. Date: Apr. 7, 2011

(65) Prior Publication Data
US 2012/0192489 A1 Aug. 2, 2012

Related U.S. Application Data

(60) Provisional application No. 61/248,064, filed on Oct. 2, 2009.

(51) Int. Cl.
*G05B 13/00* (2006.01)
(52) U.S. Cl.
USPC ................................................ 49/28; 49/506
(58) Field of Classification Search
USPC ............... 200/61.43; 324/660, 661, 688, 658;
340/657; 49/506, 26, 28, 498.1
See application file for complete search history.

(56) References Cited

U.S. PATENT DOCUMENTS

| 4,910,967 | A * | 3/1990 | Takahashi | 62/176.1 |
|---|---|---|---|---|
| 5,621,290 | A * | 4/1997 | Heller et al. | 318/466 |
| 6,337,549 | B1 | 1/2002 | Bledin | |
| 6,377,009 | B1 * | 4/2002 | Philipp | 318/468 |
| 6,700,393 | B2 * | 3/2004 | Haag et al. | 324/674 |
| 6,876,949 | B2 * | 4/2005 | Hilliard et al. | 702/182 |
| 6,988,052 | B2 * | 1/2006 | Hilliard et al. | 702/182 |
| 7,015,666 | B2 | 3/2006 | Staus | |
| 7,046,129 | B2 | 5/2006 | Regnet et al. | |
| 7,116,117 | B2 * | 10/2006 | Nakano et al. | 324/688 |
| 7,202,674 | B2 * | 4/2007 | Nakano et al. | 324/661 |
| 7,545,153 | B2 * | 6/2009 | Abe | 324/663 |
| 2004/0145378 | A1 * | 7/2004 | Shoji et al. | 324/663 |
| 2005/0179415 | A1 * | 8/2005 | Nakano et al. | 318/478 |
| 2008/0234895 | A1 * | 9/2008 | Veerasamy | 701/36 |
| 2008/0303685 | A1 * | 12/2008 | Nakano et al. | 340/686.6 |

(Continued)

OTHER PUBLICATIONS

PCT/CA2010/001599 International Search Report Jan. 12, 2011.

*Primary Examiner* — Jerry Redman
(74) *Attorney, Agent, or Firm* — Gowling Lafleur Henderson LLP

(57) ABSTRACT

A method for preventing a vehicular door or window panel from pinching an obstruction extending through an aperture of the vehicle by measuring a capacitance of a field extending through the aperture using a capacitive sensor as a motor drives the panel between the open and closed positions, correlating the measured capacitance to panel position to create closing data, comparing the closing data to a reference map to create a compare value, and detecting an object in a path of the panel as it moves toward the closed position when the compare value exceeds a threshold value. The threshold value is dependent on the relative wetness of the sensor, which is determined by comparing the capacitance of the sensor at predetermined panel positions against a calibration wetness profile.

7 Claims, 3 Drawing Sheets

(56) References Cited

U.S. PATENT DOCUMENTS

| | | |
|---|---|---|
| 2008/0309170 A1* | 12/2008 | Ando .......................... 307/125 |
| 2009/0126476 A1* | 5/2009 | Veerasamy ............... 73/170.17 |
| 2009/0146668 A1 | 6/2009 | Wuerstlein et al. |
| 2009/0146827 A1 | 6/2009 | Wuerstlein et al. |
| 2010/0242587 A1* | 9/2010 | Veerasamy ............... 73/170.17 |
| 2011/0285408 A1* | 11/2011 | Satake et al. .................. 324/679 |
| 2011/0295505 A1* | 12/2011 | Melcher et al. .................. 702/3 |
| 2013/0019618 A1* | 1/2013 | Veerasamy et al. .............. 62/85 |

* cited by examiner

VEHICULAR ANTI-PINCH SYSTEM WITH RAIN COMPENSATION

FIELD OF THE INVENTION

The present invention relates to the art of vehicular non-contact anti-pinch systems for preventing a closure panel such as a window or sliding door from pinching an object such as a person's hand as the closure panel moves into its closed position.

BACKGROUND OF THE INVENTION

Proximity sensors are widely used in the automotive industry to automate the control of power accessories. For instance, proximity sensors are often used in power window controllers to detect the presence of obstructions in the window frame when a window panel is being directed to the closed position. Such sensors can also be used to detect the presence of obstructions in other types of automotive closures such as sunroofs, side doors, sliding doors, lift gates, and deck lids.

A variety of capacitor-based proximity sensors are known in the art. For example, U.S. Pat. No. 6,377,009 discloses a system for preventing the pinching or trapping of a foreign object by a closing panel (such as a window) through the use of a sensing electrode or plate. This electrode is a metal strip or wire which is embedded in a plastic or rubber molding strip placed behind a piece of fascia or other trim part. The metal strip or wire and the chassis of the vehicle collectively form the two plates of a sensing capacitor. A foreign object placed between these two electrodes changes the dielectric constant and thus varies the amount of charge stored by the sensing capacitor over a given period of time. The charge stored by the sensor capacitor is transferred to a reference capacitor in order to detect the presence of a foreign object. Similar capacitive sensing applications are known from DE 4036465A, DE 4416803A, DE 3513051A1, DE 4004353A.

There are two major problems that have to be overcome for capacitive anti-pinch systems to work well in practice.

The first problem relates to the large background capacitance presented by the relatively enormous area of the sheet metal and plastic surrounding the closure aperture. For instance, in a power sliding door application, there is a large gap in between the sliding door and the vehicle frame. The presence of a small element such as a child's finger may not make an appreciable difference to the overall capacitance, and thus may be rejected as noise. Alternatively, if a relatively high sensitivity is employed to detect such a small change, too many false positives may occur (it being understood that no system is perfect and that there many some acceptable degree of false positives).

The second problem relates to the variable capacitance presented by changing humidity or water levels. The existence of high humidity or water will increase the dielectric constant of the system and thus will either mask the presence of a small object such as a child's finger or cause too many false positives.

In order to deal with such issues, it is known to utilize capacitive shielding and a differential capacitance sensing system which reduces the effect of parasitic capacitance arising from the sheet metal. It is also known to map the background capacitance as the closure panels opens and use that map as a reference as the closure panel closes to detect a differential. And it is known to vary the sensitivity of the system as the closure panel nears its final closing position. See, for instance, Applicant's PCT Publication Nos. WO 2002/101929, WO 2002/012699, WO 2003/038220, and WO 2005/059285.

However, the presence of water can still cause too many false positives, particularly when the sensor itself is wet. And since a human being's dielectric constant is similar to the dielectric constant of water, there could be a situation when the presence of water on the sensor causes too many false positives.

SUMMARY OF THE INVENTION

According to a first aspect of the invention, a method is provided for preventing a closure panel from pinching an obstruction extending through an aperture of a motor vehicle having a motor to drive the closure panel between an open position and a closed position. The method includes: measuring a capacitance of a field extending through the aperture using a capacitive sensor as the motor drives the closure panel between the open and closed positions; identifying a position of the motor using a position sensor as the motor drives the closure panel between the open and closed positions; correlating the measured capacitance to the position identified to create closing data; comparing the closing data to a reference map to create a compare value; and detecting an object in a path of the closure panel as the closure panel moves toward the closed position when the compare value exceeds a threshold value dependent on the relative wetness of the sensor.

The threshold value is preferably adjusted for each closure of the panel by comparing the capacitance of the sensor at predetermined closure panel positions against a calibration wetness profile to determine the relative wetness of the capacitive sensor and determine a threshold adjustment value based on the relative wetness of the capacitive sensor.

The reference map is preferably generated each time the closure panel moves from the closed position to the open position by: measuring a capacitance of the field extending through the aperture using the capacitive sensor as the motor drives the closure panel, identifying a position of the motor using the position sensor as the motor drives the closure panel, and correlating the measured capacitance to the position identified.

Preferably, the method also includes measuring a time period that the compare value exceeds the threshold value to distinguish the detection of the object from noise.

The capacitance may be measured indirectly by cyclically charging the capacitance sensor and transferring charge therefrom to a reference capacitor, and either measuring the voltage of the reference capacitor after a predetermined number of charging cycles or measuring the number of cycles required to charge the reference capacitor to a predetermined voltage.

The capacitive sensor preferably includes a non-conductive casing, a first at least partially conductive body embedded in the casing, a second at least partially conductive body embedded in the casing, an air gap between the first and second at least partially conductive bodies, a first conductive strip electrode embedded in the first dielectric body, and a second conductive strip electrode embedded in the second dielectric body, wherein the casing, the at least partially conductive bodies and the strip electrodes are sufficiently flexible to allow the first and second at least partially conductive bodies to contact one another upon the application of a predetermined pinch force.

Utilizing such a capacitive sensor, the method preferably includes further detecting an object in the path of the closure panel as it moves toward the closed position when the electrical resistance between the first and second electrodes falls below a predetermined resistance.

The method may also include further detecting an object in the path of the closure panel as it moves toward the closed position by monitoring the position sensor to for lack of change therein or by monitoring the current drawn by the motor.

Once an object is detected, the closure panel is prevented from continuing to move toward the closed position and is preferably reversed.

A controller and control circuitry is enabled to carry out the foregoing functions.

BRIEF DESCRIPTION OF THE DRAWINGS

The foregoing and other aspects of the invention will be better understood from the following detailed description of preferred embodiments of the invention in conjunction with the drawings thereof, wherein.

DETAILED DESCRIPTION OF THE INVENTION

This application incorporates the following publications by reference in their entirety:
PCT Publication No. WO 2002/101929
PCT Publication No. WO 2002/012699
PCT Publication No. WO 2003/038220
PCT Publication No. WO 2005/059285

Figure 1:
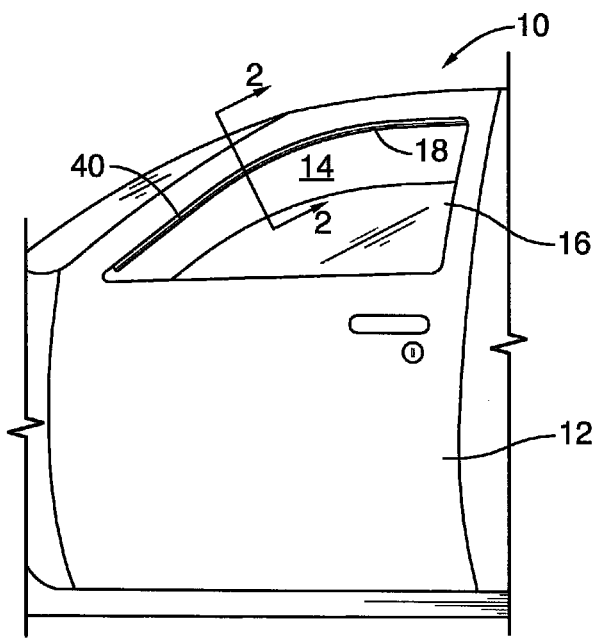
FIG. 1 is a diagram of an automotive door having an obstruction sensor mounted thereto.

FIG. 1 illustrates a typical automotive door 12 that is comprised of sheet metal and includes an aperture 14, structured as a window frame 40, which may be closed by a window pane or glass panel 16. The glass panel 16 is raised or lowered by a window regulator (not shown) which includes an electric motor as the motive driving source, as well known in the art per se. The motor is controlled in part by a non-contact obstruction sensor or anti-pinch assembly 10, the particulars of which are described in greater detail below. The anti-pinch assembly 10 includes an elongate sensor 18 that prevents the glass panel 16 from pinching or crushing a foreign object such a finger (not shown) that may be extending through the aperture 14 when the panel nears its closed position. It will be appreciated by those skilled in the art that the anti-pinch assembly 10 can be applied to any motorized or automated closure panel structure that moves between an open position and a closed position. For example, a non-exhaustive list of closure panels includes window panes, sliding doors, lift gates, sunroofs and the like. For applications such as window panes or sun roofs, the elongate sensor 18 may be mounted on the frame of the vehicle, and for applications such as powered sliding doors the elongate sensor 18 may be mounted on the closure panel itself, .e.g., at the leading edge of the sliding door. For ease of description, the remainder of this disclosure will focus on the windowpane and window frame combination, it being understood that the apparatus and methods described herein can be applied to other types of vehicular closure systems.

Figure 2:
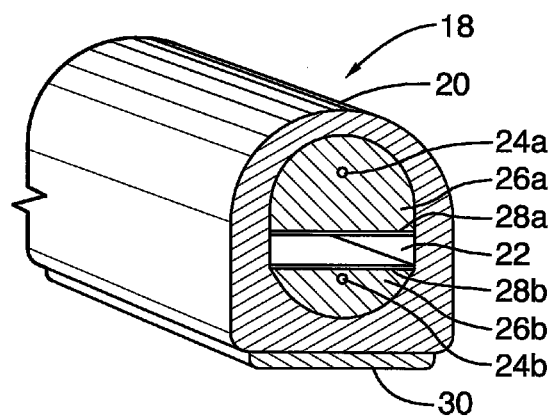
FIG. 2 is a cross-sectional view of a portion of an elongate obstruction sensor taken along line 2-2 in FIG. 1.

Referring additionally to FIG. 2, the elongate sensor 18 includes a non-conductive casing 20 mounted near or on the upper part of window frame 40 as seen in FIG. 1. Two conductive strip electrodes 24a and 24b such as wires are preferably disposed in the casing 20. Electrode 24a is embedded in a first partially conductive body 26a and electrode 24b is embedded in a second partially conductive body 26b. These partially conductive bodies 26a, 26b may be formed from a carbonized or electrically conductive rubber, and the surfaces 28a, 28b of these bodies preferably have a greater concentration of carbon or conductive material and thus able to carry a greater current than the inner part of the body. An air gap 22 separates the two partially conductive bodies 26a, 26b, and an adhesive tape 30 provides a means for fastening the casing 20 to the window frame 40.

The casing 20 is preferably formed as an extruded, oblong, elastomeric trim piece with co-extruded upper and lower partially conductive bodies 26a, 26b, and the electrodes 24a and 24b are molded directly into the bodies 26a, 26b. The trim piece can be part of the window water sealing system, i.e., form part of a seal, or can form part of the decorative fascia of the vehicle.

The air gap 22 electrically insulates the two electrodes 24a, 24b so electrical charge can be stored therebetween in the manner of a conventional capacitor. However, unlike a conventional capacitor, the elongate sensor 18 is flexible enough to enable the surfaces 28a, 28b of the first and second partially conductive bodies 26a, 26b to touch one another when pinched (i.e., as a result of a pinch condition), but not so flexible as to cause contact with one another as the closure panel ordinarily closes. The flexibility of the elongate sensor 18 can be controlled by its cross sectional configuration, including controlling the thickness of the casing walls and the thickness of the partially conductive bodies 26a, 26b.

Figure 3:
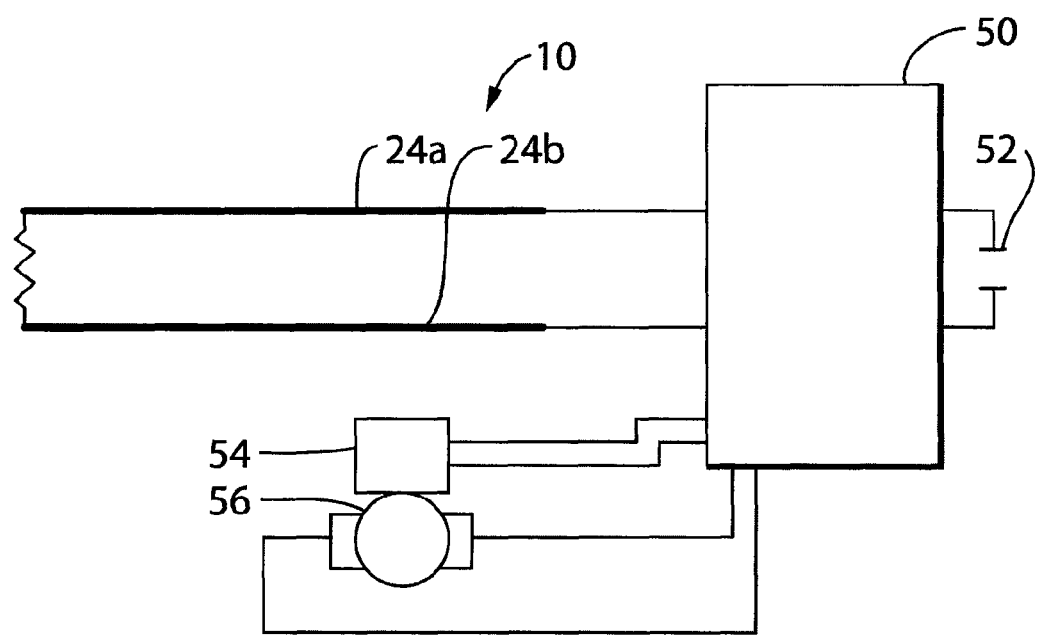
FIG. 3 is a system block diagram of an anti-pinch system.

Referring additionally to FIG. 3, the anti-pinch assembly 10 includes a controller 50 connected to the two electrodes 24a, 24b that measures the resistance R between the electrodes. The resistance R will be very high when the partially conductive bodies 26a, 26b are separated from each other by the air gap 22, and will substantially reduce in magnitude if a portion of the partially conductive bodies 26a, 26b contact one another. Thus, the elongate sensor 18 and anti-pinch assembly 10 is capable of functioning as a fail-safe contact pinch strip.

In addition to functioning as a contact pinch strip, the elongate sensor 18 also functions as a non-contact capacitive sensor, and is utilized by the controller 50 to measure a capacitance of a field extending through the aperture 14. In the illustrated embodiment, electrode 24b functions as a shielding electrode since it is closer to the sheet metal whereby the electric field sensed by electrode 24a will be more readily influenced by the closer electrode 24b than the vehicle sheet metal. For best signal quality it is most preferable if the door is electrically isolated from the remainder of the vehicle. A powered sliding door, for instance, may be isolated through the use of non-conductive rollers.

The capacitance of the elongate sensor 18 is measured as follows: The electrodes 24a and 24b are preferably charged by controller 50 to the same potential using a pre-determined pulse train. For each cycle the controller 50 transfers charge accumulated between the electrodes 24a and 24b to a larger reference capacitor 52, and records an electrical characteristic indicative of the capacitance of the system. The electrical characteristic may be the resultant voltage of the reference capacitor 52 where a fixed number of cycles is utilized to charge the electrodes 24a and 24b, or a cycle count (or time) where a variable number of pulses are utilized to charge the reference capacitor 52 to a predetermined voltage. The average capacitance of the sensor 18 over the cycles may also be directly computed. See, for example, the foregoing publications incorporated by reference herein, which describe various circuitry for carrying out such functions. It will be noted that where an obstruction exists, the dielectric constant between the electrodes 24a and 24b will change, typically increasing the capacitance of the elongate sensor 18 and thus affecting the recorded electrical characteristic.

Figure 4:
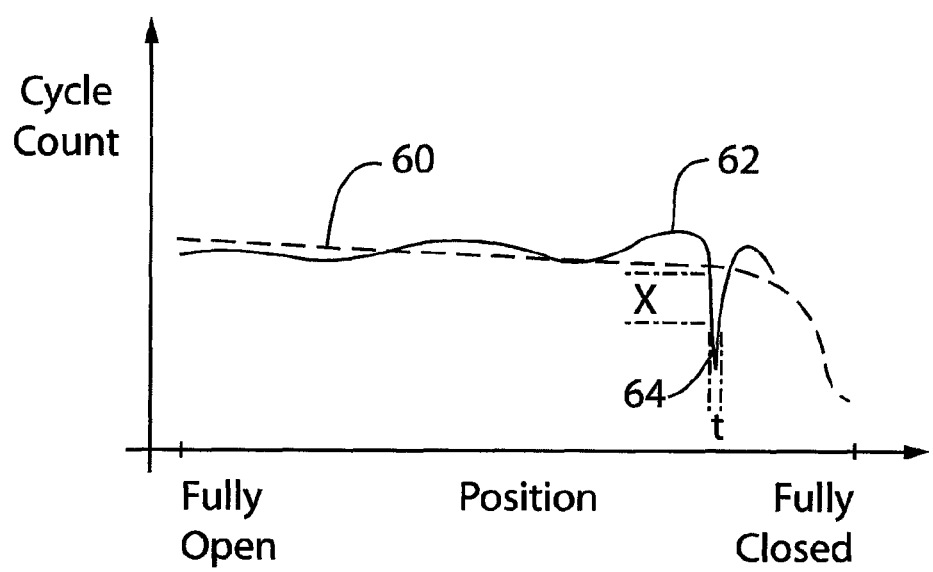
FIG. 4 is a schematic graph illustrating a method of detecting an object based on capacitive sensing.

In preferred embodiments, whenever the glass panel 16 is opened the controller 50 creates an opening capacitive reference map 60 by plotting the recorded electrical characteristic against the position (provided by a position sensor such as Hall effect sensor 54) of the glass panel 16. In FIG. 4, the opening reference map 60 is shown as a graph correlating cycle count against glass panel position. The controller 50 also measures a second capacitance map 62 (the "closing data") as the glass panel 16 closes that is compared against the opening reference map 60. Whenever the comparison exceeds a threshold value X for a period of time t, such as at dip 64, an obstacle is detected. (Cycle count decreases if the capacitance of the sensor 18 increases.)

Figure 6:
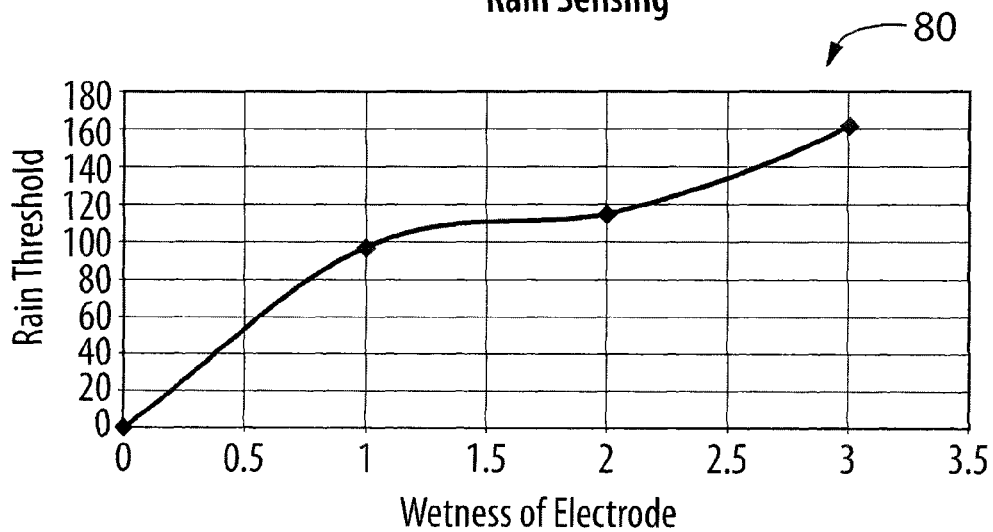
FIG. 6 is a graph of an adjustment factor based on the degree of sensor wetness.

In order to deal with the possible presence of water on the sensor 18, the controller 50 adjusts the threshold value based on the relative wetness of the sensor 18, as shown in plot 80 of FIG. 6. In this profile, "0" represents a dry seal 18, and "3" a drenched seal 18. For a dry seal, no change is made to an initial threshold value $X^0$, but for wet seals the threshold value X varies in accordance with the degree of wetness.

Figure 5:
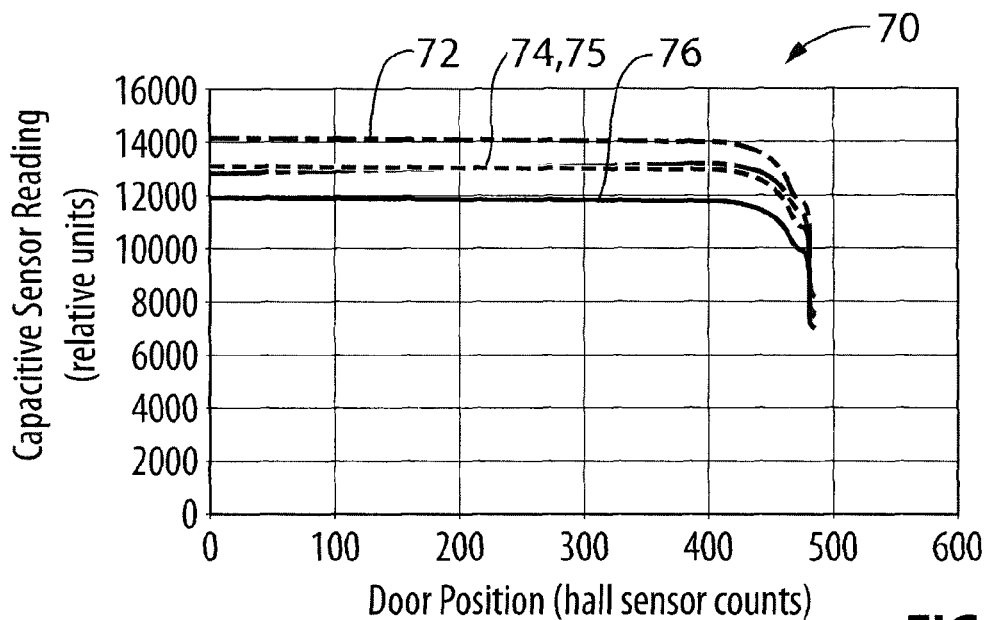
FIG. 5 is a graph of the capacitance of a sensor over varying wetness conditions.

The controller 50 determines the degree of wetness based on a calibration wetness profile 70 such as shown in FIG. 5 which is stored in non-volatile memory. The calibration profile 70 is based on empirical data obtained through known conditions of the elongate seal 18. For instance, plot 72 is based on a dry seal; plots 74, 75 are based on a seal that is wetted along $\frac{1}{3}^{rd}$ and $\frac{2}{3}^{rd}$ of its length respectively; and plot 76 is obtained from a completely wet seal all along its length. As will be seen, while the shape of each plot is quite similar, the cycle count differs because the capacitance of the seal 18 differs in each case. More granular data can be obtained, if desired, by further varying the wetting conditions.

Thus, in effecting the obstacle determination, the controller 50 compares the opening reference map 60 against the calibration wetness profile 70 to find the plot 72, 74, 75 or 76 that best matches the opening reference map 60 in order to identify the degree of wetness. In order to prevent the situation of the seal 18 becoming wet only after the glass panel is open (which is a more likely scenario with a powered sliding door system), the capacitance of the elongate seal 18 may more preferably be measured at a certain point such as at full opening (or over a certain range of positions) and compared against the capacitance value of these plots 72, 74, 75 or 76 at the same position(s) to determine the degree of wetness. Upon closing the glass panel 16, the controller 50 signals an obstacle when the difference between the closing data 62 and the opening map 60 (at common positions) exceeds a threshold value $X=X^0+D$ (as a function degree wetness) for a period of time t. When an obstacle is signaled, the controller 50 preferably reverses motor 56 to move the glass panel 16 open.

In a third mode of operation, the controller 50 also monitors the position sensor 54 and/or the current drawn by the motor 56. In the event of an obstacle, the position sensor will not increment and the current drawn by the motor will spike, thus indicating a pinch condition.

Preferably, the controller 50 utilizes all three modes of obstacle detection—sensor impedance, capacitive sensing and position/current monitoring to detect a pinch condition.

The controller 50 may also eliminate the capacitive sensing mode from consideration after two or three serial obstacle detections and rely only on the other two modes in case the capacitive sensing mode has triggered a false positive.

While the above describes a particular embodiment(s) of the invention, it will be appreciated that modifications and variations may be made to the detailed embodiment(s) described herein without departing from the spirit of the invention.

The invention claimed is:

1. A method for preventing a closure panel for an aperture of a motor vehicle from pinching an object extending through the aperture when the closure panel is moved between an open position and a closed position, the method comprising:
   measuring a capacitance of a capacitive sensor proximate the aperture as the closure panel is moved between the open and closed positions;
   identifying a position of the closure panel using a position sensor as the closure panel is moved between the open and closed positions;
   correlating the measured capacitance to the position identified to create closing data for the position;
   comparing the closing data for the position to a reference map for the position to create a compare value;
   detecting the object in the aperture as the closure panel moves through the position toward the closed position when the compare value exceeds a threshold value dependent on a relative wetness of the capacitive sensor; and
   preventing the closure panel from continuing to move toward the closed position upon detection of the object.

2. A method according to claim 1, wherein the threshold value is adjusted for each closure of the closure panel by comparing the capacitance of the capacitive sensor at predetermined closure panel positions against a calibration wetness profile to determine the relative wetness of the capacitive sensor and to determine a threshold adjustment value based on the relative wetness of the capacitive sensor.

3. A method according to claim 1, wherein the reference map for the position is generated each time the closure panel moves from the closed position to the open position by: measuring the capacitance of the capacitive sensor, identifying the position of the closure panel using the position sensor, and correlating the measured capacitance to the position identified.

4. A method according to claim 1, further comprising measuring a time period during which the compare value exceeds the threshold value to distinguish the detection of the object from noise.

5. A method according to claim 1, wherein the capacitance is measured indirectly by cyclically charging the capacitive sensor and transferring charge therefrom to a reference capacitor, and either measuring a voltage of the reference capacitor after a predetermined number of charging cycles or measuring the number of cycles required to charge the reference capacitor to a predetermined voltage.

6. A method according to claim 1, wherein the capacitive sensor includes a non-conductive casing, a first at least partially conductive body embedded in the casing, a second at least partially conductive body embedded in the casing, an air gap between the first and second at least partially conductive bodies, a first conductive strip electrode embedded in the first at least partially conductive body, and a second conductive strip electrode embedded in the second at least partially conductive body, wherein the casing, the at least partially conductive bodies and the strip electrodes are sufficiently flexible to allow the first and second at least partially conductive bodies to contact one another upon the application of a predetermined pinch force; and further comprising detecting the object in the aperture as the closure panel moves toward the closed position when an electrical resistance between the first and second strip electrodes falls below a predetermined resistance.

7. A method according to claim 1, further comprising detecting the object in the aperture as the closure panel moves toward the closed position by monitoring the position sensor for lack of change or by monitoring a current drawn by a motor used to drive the closure panel between the open and closed positions.

\* \* \* \* \*